US009100155B2

(12) United States Patent
Luo et al.

(10) Patent No.: US 9,100,155 B2
(45) Date of Patent: Aug. 4, 2015

(54) METHOD AND APPARATUS FOR CONTROL AND DATA MULTIPLEXING IN WIRELESS COMMUNICATION

(75) Inventors: Xiliang Luo, Northridge, CA (US); Tao Luo, San Diego, CA (US); Hao Xu, San Diego, CA (US); Wanshi Chen, San Diego, CA (US); Xiaoxia Zhang, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 904 days.

(21) Appl. No.: 13/099,210

(22) Filed: May 2, 2011

(65) Prior Publication Data
US 2011/0268080 A1 Nov. 3, 2011

Related U.S. Application Data

(60) Provisional application No. 61/330,852, filed on May 3, 2010, provisional application No. 61/374,169, filed on Aug. 16, 2010.

(51) Int. Cl.
H04W 4/00 (2009.01)
H04L 5/00 (2006.01)
(52) U.S. Cl.
CPC .................................. H04L 5/0053 (2013.01)
(58) Field of Classification Search
None
See application file for complete search history.

(56) References Cited

U.S. PATENT DOCUMENTS

| 2010/0195624 | A1* | 8/2010 | Zhang et al. .................. 370/335 |
| 2011/0268075 | A1* | 11/2011 | Heo et al. ...................... 370/329 |
| 2011/0299500 | A1* | 12/2011 | Papasakellariou et al. ... 370/330 |
| 2012/0207111 | A1* | 8/2012 | Jang et al. ..................... 370/329 |
| 2012/0320852 | A1* | 12/2012 | Seo et al. ...................... 370/329 |
| 2013/0238954 | A1* | 9/2013 | Jang et al. ..................... 714/758 |

FOREIGN PATENT DOCUMENTS

| AU | 2008286888 A1 | 2/2009 |
| CN | 101409894 A | 4/2009 |
| CN | 101511121 A | 8/2009 |
| CN | 101536367 A | 9/2009 |
| EP | 2086153 A2 | 8/2009 |

(Continued)

OTHER PUBLICATIONS

Alcatel-Lucent Shanghai Bell et al: 1-58 Further Discussions on UCI Multiplexing on PUSCH in case of Su- Mimo, 3GPP Draft; RI-104163, 3rd Generation Partnership Project (3GPP), Mobile Competence Centre ; 650, Route Des Lucioles; F-06921 Sophia-Antipolis Cedex ; France, vol. RAN WGI, no. Dresden, Germany; 20100628, Jul. 5, 2010. XP050449590.

(Continued)

*Primary Examiner* — Gregory Sefcheck
*Assistant Examiner* — Jenkey Van
(74) *Attorney, Agent, or Firm* — Liem T. Do

(57) ABSTRACT

A method of wireless communication includes determining a number of symbols for uplink control information (UCI) on each of a plurality of layers, multiplexing symbols for the UCI with data on multiple layers such that the symbols are time aligned across the layers, and sending the multiplexed symbols on the multiple layers on uplink. In some designs, the number of symbols for the UCI may be determined based on a spectral resource parameter.

52 Claims, 11 Drawing Sheets

(56) References Cited

FOREIGN PATENT DOCUMENTS

| JP | 2010087634 A | 4/2010 |
|---|---|---|
| JP | 2012521166 A | 9/2012 |
| JP | 2013509053 A | 3/2013 |
| JP | 2013528029 A | 7/2013 |
| JP | 2013533678 A | 8/2013 |
| WO | WO-2010107779 A2 | 9/2010 |
| WO | WO-2011076662 A1 | 6/2011 |
| WO | WO-2011082589 A1 | 7/2011 |
| WO | WO-2011129626 A2 | 10/2011 |
| WO | WO-2011155773 A2 | 12/2011 |

OTHER PUBLICATIONS

International Search Report and Written Opinion—PCT/US2011/035028, International Search Authority—European Patent Office—Sep. 27, 2011.

LG Electronics: "Multiplexing scheme with UCI and data on PUSCH", 3GPP Draft; R1-102387-LG_UCI_Multiplexing, 3rd Generation Partnership Project (3GPP), Mobile Competence Centre ; 650, Route Des Lucioles ; F-06921 Sophia-Antipolis Cedex ; France, vol. RAN WGI, no. Beijing, china; 20100412, Apr. 6, 201, XP050419609.

Nokia Siemens Networks et al: "UCI 1-8, transmission on PUSCH with SU-MIMO", 10-12, 3GPP Draft; RI-101905, 3rd Generation 14-21, Partnership Project (3GPP), Mobile 23-25, Competence Centre ; 650, Route Des 27-31, Lucioles ; F-06921 Sophia-Antipolis Cedex 33-36, ; France, 38-58 vol. RAN WGI, no. Beijing, china; 20100412, Apr. 6, 2010, XP050419255.

Samsung: "Further Discussion on Data and 1-58 Control Multiplexing in UL MIMO Transmissions", 3GPP Draft; RI-103675 UL MIMO UCI and PUSCH MUX, 3rd Generation Partnership Project (3GPP), Mobile Competence Centre ; 650, Route Des Lucioles ; F-06921 Sophia-Antipolis Cedex ; France, vol. RAN WGI, no. Dresden, Germany; 20100628, Jun. 22, 2010, XP050449122.

3rd Generation Partnership Project; Technical Specification Group Radio Access Network; Evolved Universal Terrestrial Radio Access (E-UTRA); Multiplexing and channel coding (Release 9), 3GPP TS 36.212 V9.1.0 (Mar. 2010).

3GPP TSG-RAN WG1#62, "Clarifications of UCI on PUSCH [online]," Qualcomm Incorporated, R1-104806, <URL: http://www.3gpp.org/ftp/tsg_ran/WG1_RL1/TSGR1_62/Docs/R1-104806.zip>.

3GPP, "UCI Multiplexing for SU-MIMO Transmission", Qualcomm Incorporated, R1-102762,May 14, 2010.

"3rd Generation Partnership Project; Technical Specification Group Radio Access Network; Evolved Universal Terrestrial Radio Access (E-UTRA); Multiplexing and channel coding" (Release 8), 3GPP TS 36.212 V8.6.0 (Mar. 2009), Section 5.3.3.1.5.

Taiwan Search Report—TW100115509—TIPO—Dec. 26, 2013.

3GPP TSG RAN WG1 #58bis, R1-094166, Issues on UL clustered DFT-S-OFDMA transmission, LG electronics, Oct. 12-16, 2009.

* cited by examiner

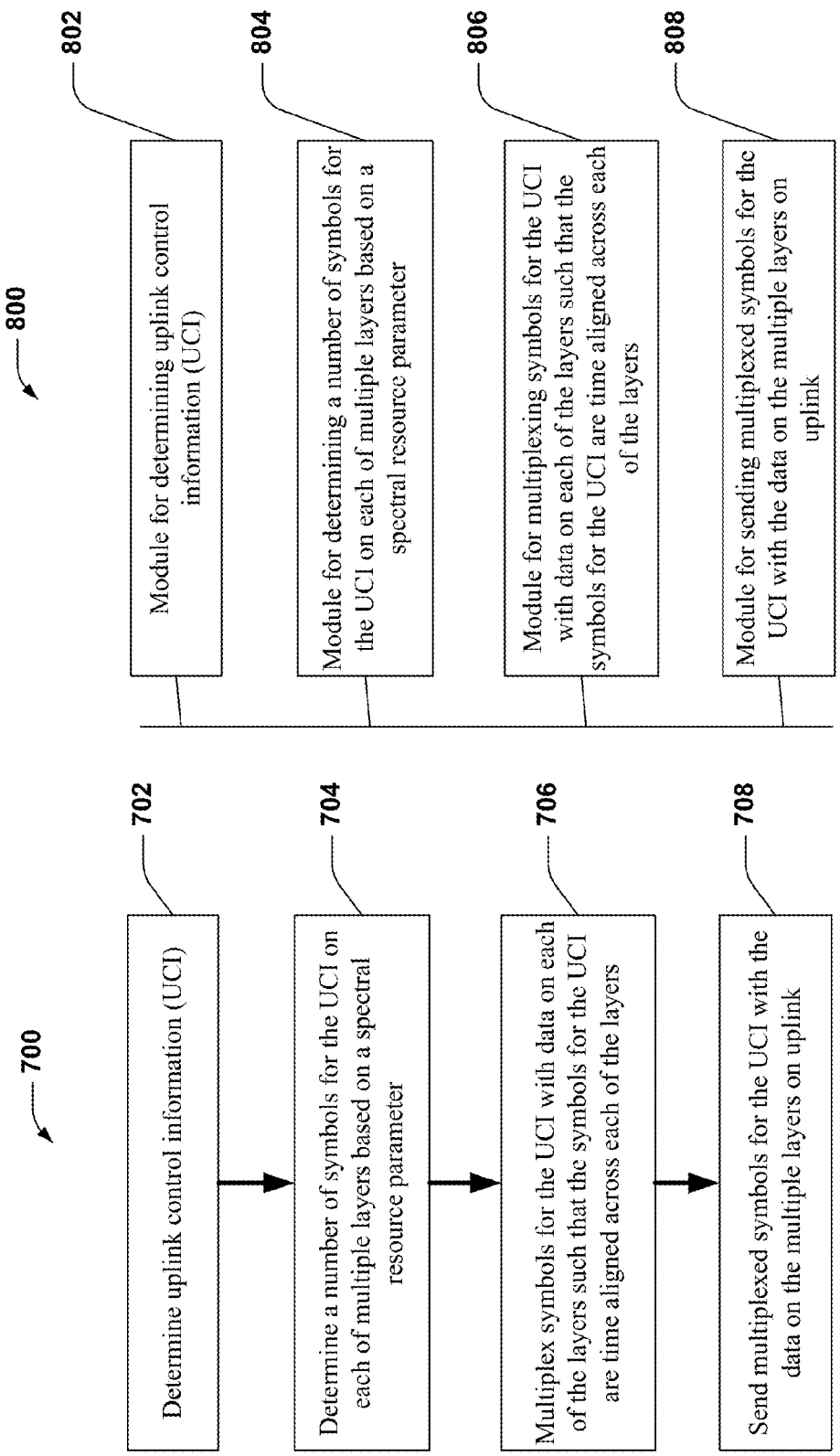

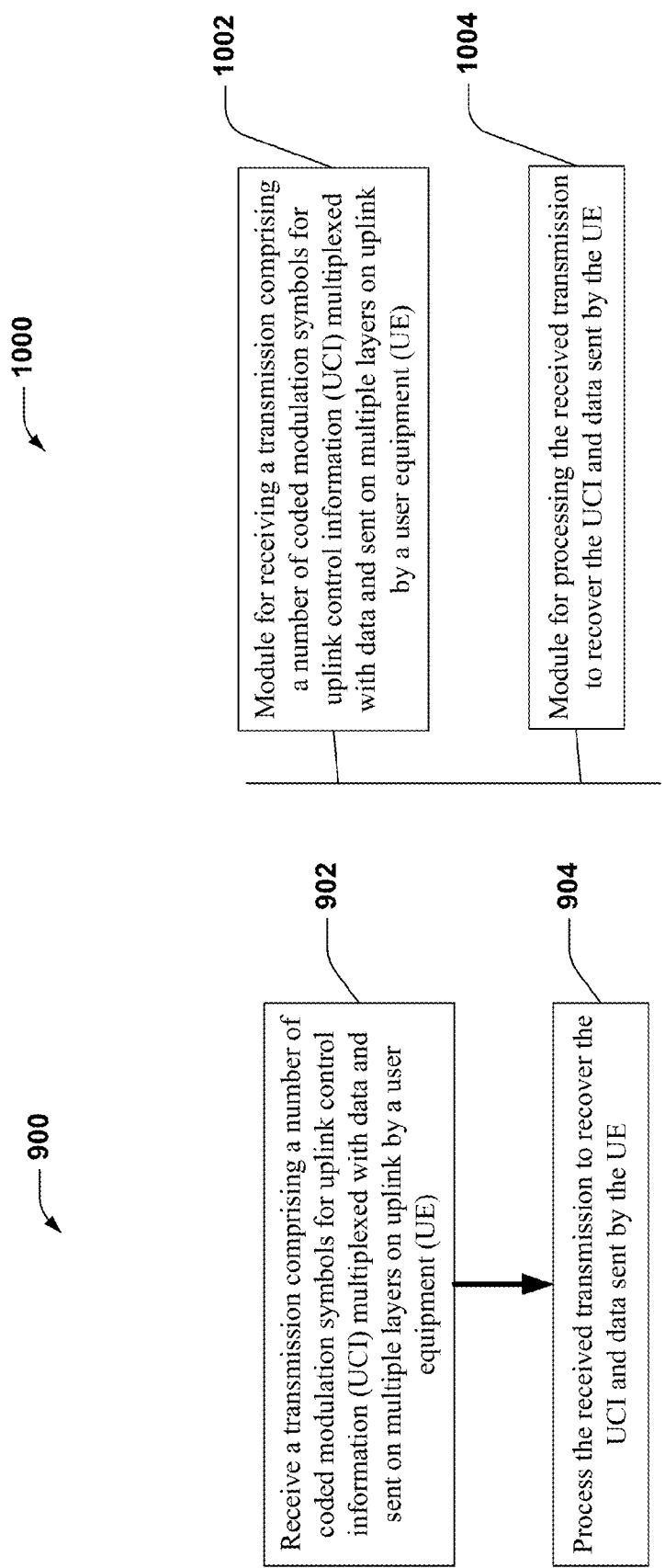

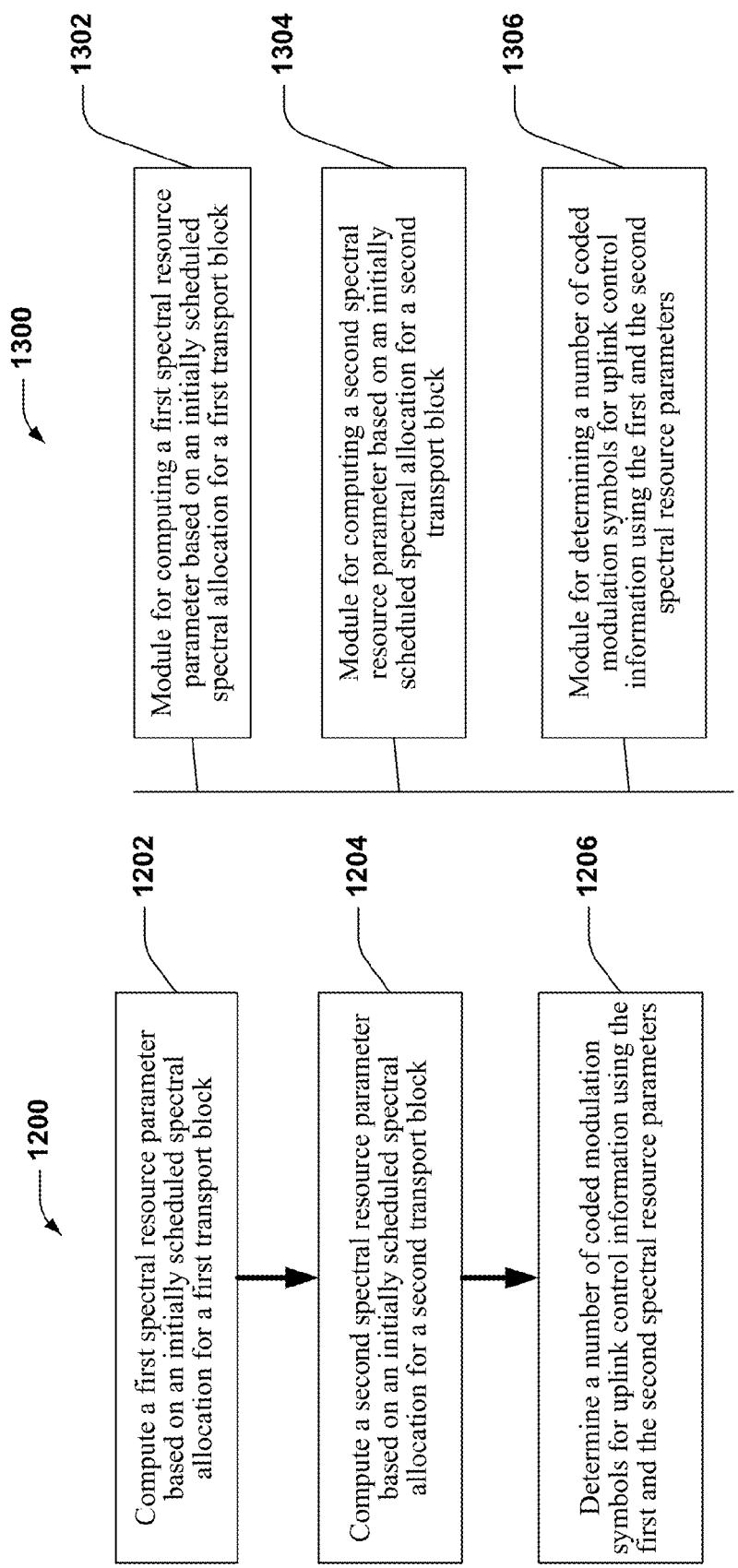

METHOD AND APPARATUS FOR CONTROL AND DATA MULTIPLEXING IN WIRELESS COMMUNICATION

CROSS-REFERENCE TO RELATED APPLICATIONS

This application claims the benefit of priority from U.S. Provisional Patent Application Ser. No. 61/330,852, entitled "METHOD AND APPARATUS FOR MULTIPLEXING CONTROL INFORMATION AND DATA IN A WIRELESS COMMUNICATION SYSTEM," filed on May 3, 2010 and U.S. Provisional Patent Application Ser. No. 61/374,169, entitled "METHOD AND APPARATUS FOR CALCULATING NUMBER OF CODED MODULATION SYMBOLS IN A WIRELESS TRANSMISSION," filed on Aug. 16, 2010, each of which is herein incorporated by reference in its entirety.

BACKGROUND

I. Field

The following description relates generally to wireless communications, and more particularly to transmitting uplink control information multiplexed with data on multiple layers in wireless communication.

II. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and the reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A wireless communication system may include a number of base stations that can support communication for a number of user equipments (UEs). A base station may include multiple transmit and/or receive antennas. Each UE may include multiple transmit and/or receive antennas. The UEs may transmit uplink control information (UCI) on a physical uplink control channel (PUCCH). However, if UCI needs to be fed back when there is concurrent physical uplink shared channel (PUSCH) transmission, and there is only a single layer for uplink, the UCI may be multiplexed with data and sent in PUSCH in order to maintain the single-carrier waveform in the uplink.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. For example, multiple spatial layers may deliver multiple data streams on a given frequency-time resource. The streams may be transmitted independently on separate antennas. Thus, in order to benefit from the improved performance of a MIMO system, there may be a need for multiplexing UCI with data in PUSCH when there are multiple spatial layers for the uplink.

SUMMARY

The following presents a simplified summary of one or more embodiments in order to provide a basic understanding of such techniques and embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one aspect, a method for wireless communication includes determining uplink control information (UCI), determining a number of symbols for the UCI on each of a plurality of layers based on a spectral resource parameter, multiplexing symbols for the UCI with data on each of the plurality of layers such that the symbols for the UCI are time aligned across each of the plurality of layers, and sending the multiplexed symbols for the UCI with the data on the plurality of layers on uplink.

In another aspect, an apparatus for wireless communication includes means for determining uplink control information (UCI), means for determining a number of symbols for the UCI on each of a plurality of layers based on a spectral resource parameter, means for multiplexing symbols for the UCI with data on each of the plurality of layers such that the symbols for the UCI are time aligned across each of the plurality of layers, and means for sending the multiplexed symbols for the UCI with the data on the plurality of layers on uplink.

In yet another aspect, an apparatus for wireless communication including at least one processor is disclosed. The at least one processor is configured to determine uplink control information (UCI), to determine a number of symbols for the UCI on each of a plurality of layers based on a spectral resource parameter, to multiplex symbols for the UCI with data on each of the plurality of layers such that the symbols for the UCI are time aligned across each of the plurality of layers, and to send the multiplexed symbols for the UCI with the data on the plurality of layers on uplink. The apparatus further includes a memory coupled to the at least one processor.

In yet another aspect, a computer program product comprising a non-transitory computer-readable medium storing computer-executable instructions is disclosed. The instructions include instructions for causing at least one computer to determine uplink control information (UCI), instructions for causing the at least one computer to determine a number of symbols for the UCI on each of a plurality of layers based on a spectral resource parameter, instructions for causing the at least one computer to multiplex symbols for the UCI with data on each of the plurality of layers such that the symbols for the UCI are time aligned across each of the plurality of layers, and instructions for causing the at least one computer to send the multiplexed symbols for the UCI with the data on the plurality of layers on uplink.

In yet another aspect, a method for wireless communication includes receiving a transmission comprising a number of coded modulation symbols for uplink control information (UCI) multiplexed with data and sent on a plurality of layers on uplink by a user equipment (UE) such that the coded modulation symbols for the UCI are time aligned across each of the plurality of layers and the number of the coded modulation symbols on each of the plurality of layers is based on a spectral resource parameter, and processing the received transmission to recover the UCI and data sent by the UE.

In yet another aspect, an apparatus for wireless communication includes means for receiving a transmission comprising a number of coded modulation symbols for uplink control information (UCI) multiplexed with data and sent on a plurality of layers on uplink by a user equipment (UE), wherein the coded modulation symbols for the UCI are time aligned across each of the plurality of layers and the number of the coded modulation symbols on each of the plurality of layers is based on a spectral resource parameter, and means for processing the received transmission to recover the UCI and data sent by the UE.

In yet another aspect, an apparatus for wireless communication including at least one processor is disclosed. The at least one processor is configured to receive a transmission comprising a number of coded modulation symbols for uplink control information (UCI) multiplexed with data and sent on a plurality of layers on uplink by a user equipment (UE), wherein the coded modulation symbols for the UCI are time aligned across each of the plurality of layers and the number of the coded modulation symbols on each of the plurality of layers is based on a spectral resource parameter, and to process the received transmission to recover the UCI and data sent by the UE In yet another aspect, a computer program product includes a non-transitory computer-readable medium storing computer-executable instructions is disclosed. The instructions include instructions for causing at least one computer to receive a transmission comprising a number of coded modulation symbols for uplink control information (UCI) multiplexed with data and sent on a plurality of layers on uplink by a user equipment (UE), wherein the coded modulation symbols for the UCI are time aligned across each of the plurality of layers and the number of the coded modulation symbols on each of the plurality of layers is based on a spectral resource parameter, and instructions for causing the at least one computer to process the received transmission to recover the UCI and data sent by the UE.

To the accomplishment of the foregoing and related ends, one or more aspects include the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 7 is a flow chart representation of a process for wireless communication.

FIG. 8 is a block diagram representation of a portion of a wireless communication apparatus.

FIG. 9 is a flow chart representation of a process for wireless communication.

FIG. 10 is a block diagram representation of a portion of a wireless communication apparatus.

FIG. 12 is a flow chart representation of a process for wireless communication.

FIG. 13 is a block diagram representation of a portion of a wireless communication apparatus.

DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP).

Single carrier frequency division multiple access (SC-FDMA) utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently used for uplink multiple access scheme in LTE.

It should be noted that for clarity, the subject matter below is discussed with respect to specific examples of certain signals and message formats used in LTE. However, the applicability of the disclosed techniques to other communication systems and other signal transmission/reception technology will be appreciated by one of skill in the art.

Figure 1:
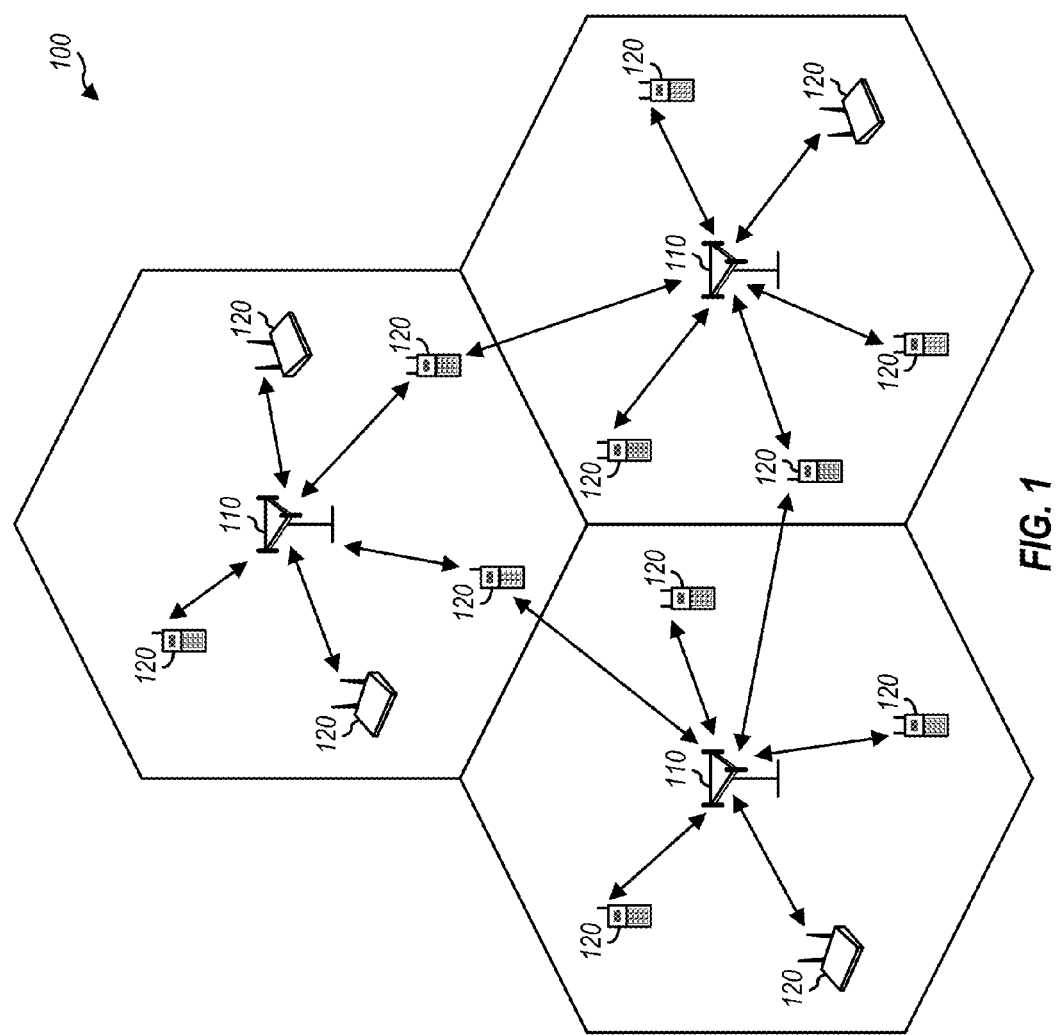
FIG. 1 illustrates a multiple access wireless communication system according to one embodiment.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the user equipments (UEs) located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.4, 3, 5, 10 or 20 mega-Hertz (MHz), respectively. The system bandwidth may correspond to a subset of the $K_s$ total subcarriers.

Figure 2:
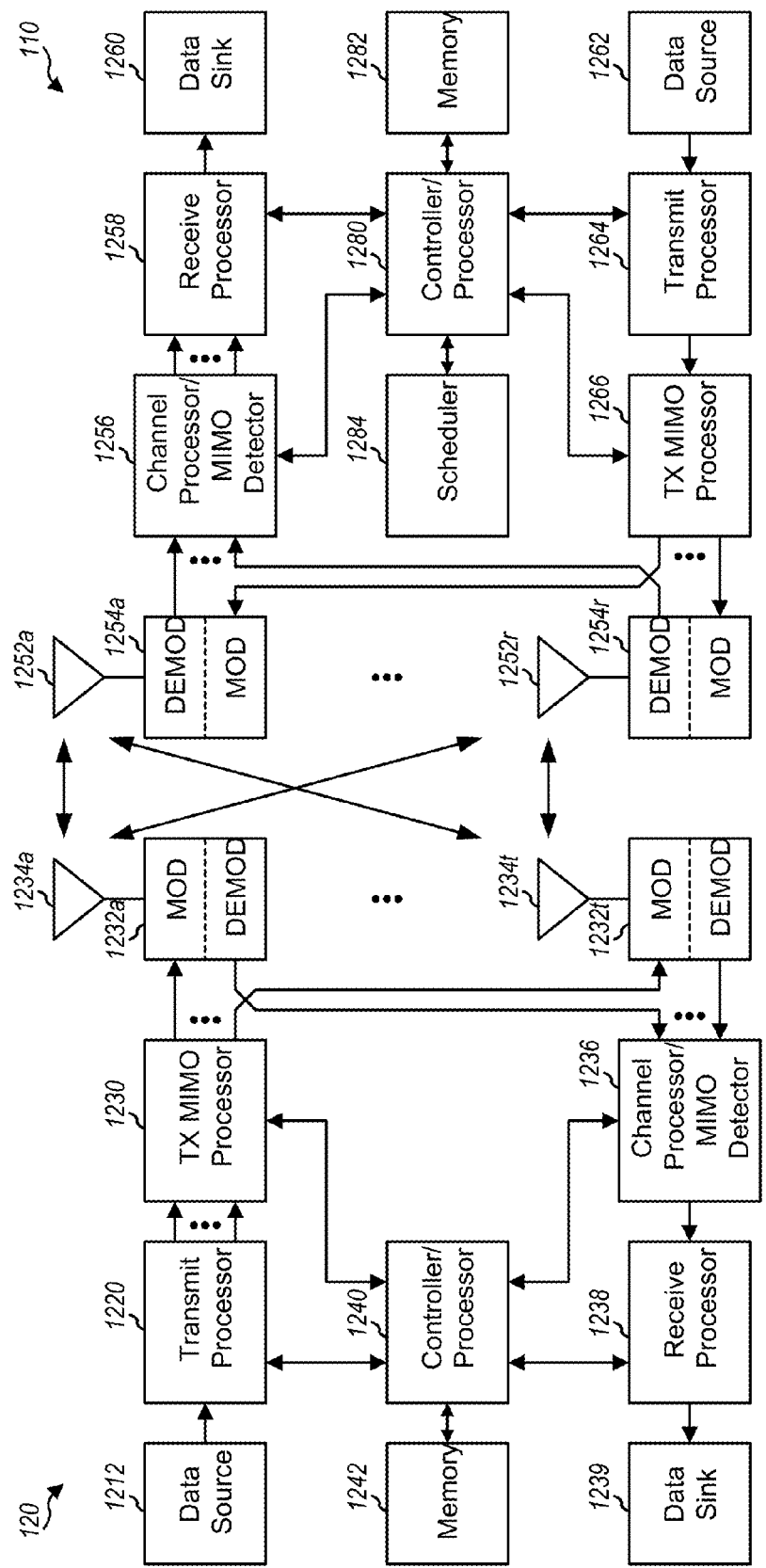
FIG. 2 illustrates a block diagram of a communication system.

FIG. 2 shows a block diagram of an exemplary base station/eNB 110 and a UE 120, which may be one of the eNBs and one of the UEs in FIG. 1. A UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 700 in FIG. 7, process 1200 in FIG. 12 and/or other processes for the techniques described herein. Processor 1256, processor 1280, and/or other processors and modules at base station 110 may perform or direct process 900 in FIG. 9, and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

Advances in digital communication has led to the use of multiple transmission antennas on UE 120. For example, in LTE Release 10, a single user multiple-in-multiple-out (SU-MIMO) mode is defined, in which, a UE 120 may transmit up to two transport blocks (TBs) to the eNB 110. TBs are also sometimes called codewords (CWs), although sometimes the mapping from TBs to CWs may follow a permutation, such as swapping two TBs mapped to a pair of CWs.

Although concurrent PUCCH and PUSCH transmission may be allowed when there are multiple layers for uplink, it may still be desirable in some situations to multiplex UCI with data in PUSCH when there are multiple spatial layers for uplink.

In LTE Rel-10 UL MIMO operation, when UCI messages are multiplexed on PUSCH of rank greater than 1, i.e. more than one layer, the messages are replicated cross all layers of both codewords, and the messages are time domain multiplexed with data such that the UCI symbols are time-aligned across all layers, as discussed in FIG. 6 below. The UCI may include one or more of a hybrid automatic request acknowledgement (HARQ-ACK) message, a resource indicator (RI) message, a channel quality indicator (CQI), a precoding matrix indicator (PMI), or generally any information related to uplink control. Although LTE Rel-10 allows for concurrent PUCCH and PUSCH transmission, where the UCI can be sent in PUCCH and in parallel data can be transmitted with PUSCH, it may be desirable in some situations to multiplex UCI with data on PUSCH in order to avoid concurrent PUCCH and PUSCH transmissions. For example, it may be desirable to multiplex UCI with data in PUSCH when there are multiple layers for uplink if the UE has limited power headroom, or if the requested UCI, such as a CQI, is aperiodic. The number of coded modulation symbols used for the UCI may be determined based on one or more spectral resource parameters, as discussed in FIGS. 11-13 below.

Figure 3:
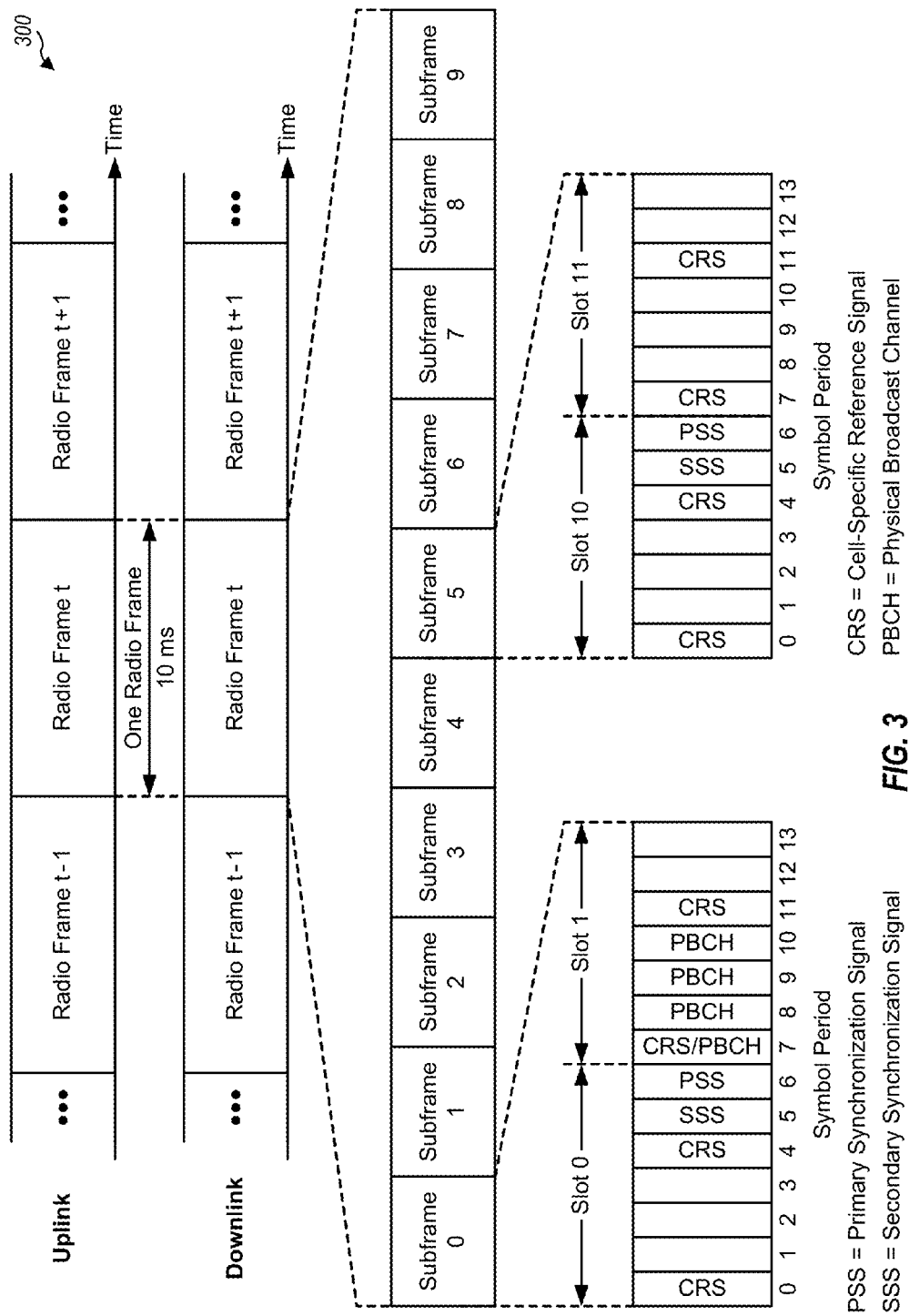
FIG. 3 illustrates an exemplary frame structure for transmission in a wireless communication system.

FIG. 3 shows an exemplary frame structure 300 for frequency division duplexing (FDD) in LTE. In other designs, a frame structure may include time division duplexing (TDD) in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

LTE utilizes OFDM on the downlink and SC-FDM on the uplink. OFDM and SC-FDM partition the system bandwidth into multiple (NFFT) orthogonal subcarriers, which are also commonly referred to as tones, bins, etc. Each subcarrier may be modulated with data. In general, modulation symbols are transmitted in the frequency domain with OFDM and in the time domain with SC-FDM. The spacing between adjacent subcarriers may be fixed, and the total number of subcarriers (NFFT) may be dependent on the system bandwidth. For example, NFFT may be equal to 128, 256, 512, 1024 or 2048 for system bandwidth of 1.4, 3, 5, 10 or 20 megahertz (MHz), respectively.

The available time frequency resources for each of the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value. On the downlink, an OFDM symbol may be transmitted in each symbol period of a subframe. On the uplink, an SC-FDMA symbol may be transmitted in each symbol period of a subframe.

Figure 4:
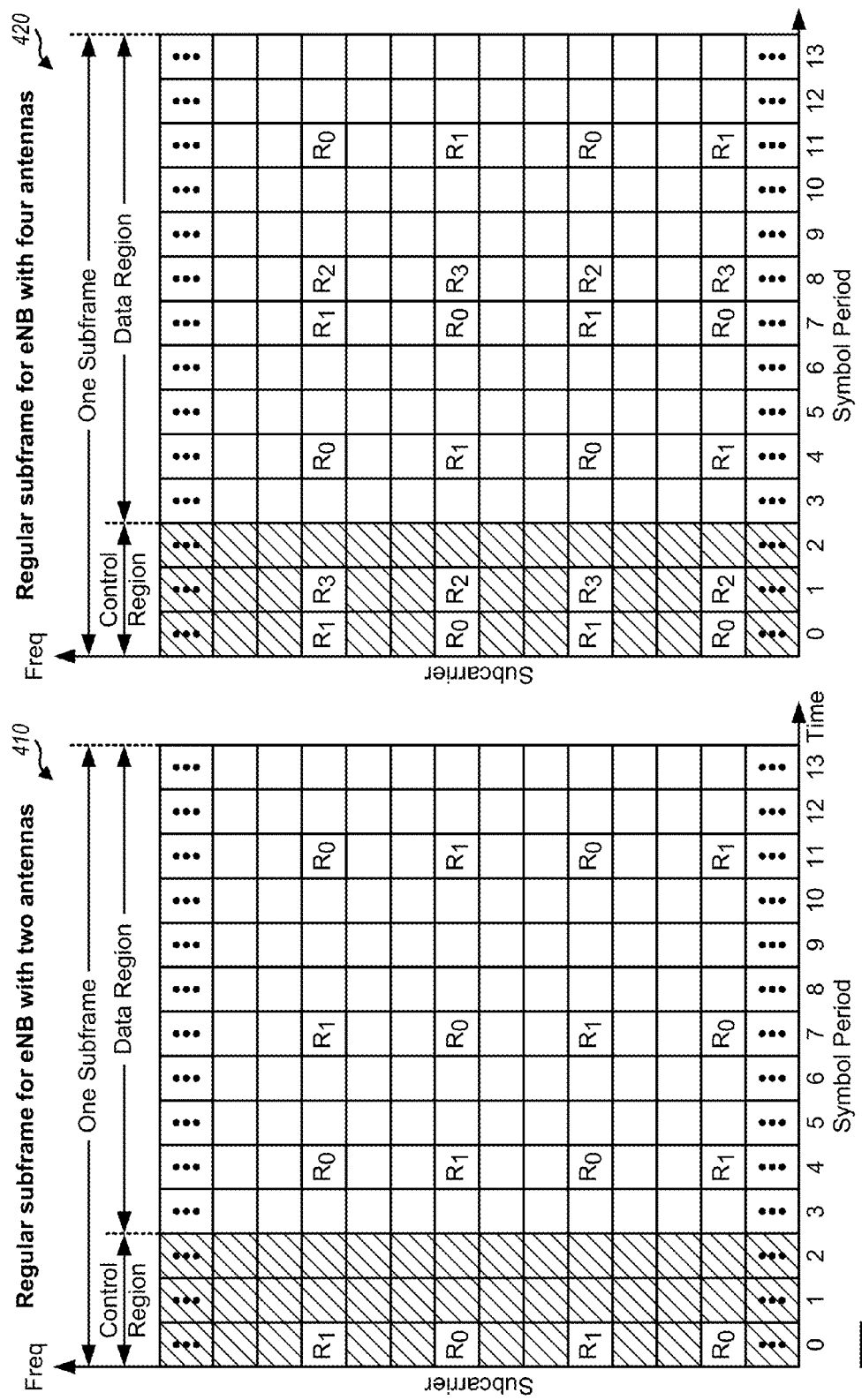
FIG. 4 illustrates exemplary subframe formats for downlink in a wireless communication system.

FIG. 4 shows two exemplary subframe formats 410 and 420 for the downlink with the normal cyclic prefix. Subframe format 410 may be used for a base station equipped with two antennas. A cell-specific reference signal (CRS) may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for a base station equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on the cell ID. Different base stations may transmit their CRSs on the same or different subcarriers, depending on their cell IDs. For both subframe formats 410 and 420, resource elements not used for the CRS may be used to transmit data (e.g., traffic data, control data, and/or other data).

For both subframe formats 410 and 420, a subframe may include a control region followed by a data region. The control region may include the first Q symbol periods of the subframe, where Q may be equal to 1, 2, 3 or 4. Q may change from subframe to subframe and may be conveyed in the first symbol period of the subframe. The control region may carry control information. The data region may include the remaining 2L-Q symbol periods of the subframe and may carry data and/or other information for UEs.

A base station may transmit a Physical Control Format Indicator Channel (PCFICH), a Physical Hybrid ARQ Indicator Channel (PHICH), and a Physical Downlink Control Channel (PDCCH) in the control region of a subframe. The PCFICH may be transmitted in the first symbol period of the subframe and may convey the size (Q) of the control region. The PHICH may carry acknowledgement (ACK) and negative acknowledgement (NACK) information for data transmission sent by UEs on the uplink with hybrid automatic repeat request (HARQ). The PDCCH may carry downlink control information (DCI) for UEs. The base station may also transmit a Physical Downlink Shared Channel (PDSCH) in the data region of a subframe. The PDSCH may carry unicast data for individual UEs, multicast data for groups of UEs, and/or broadcast data for all UEs.

Figure 5:
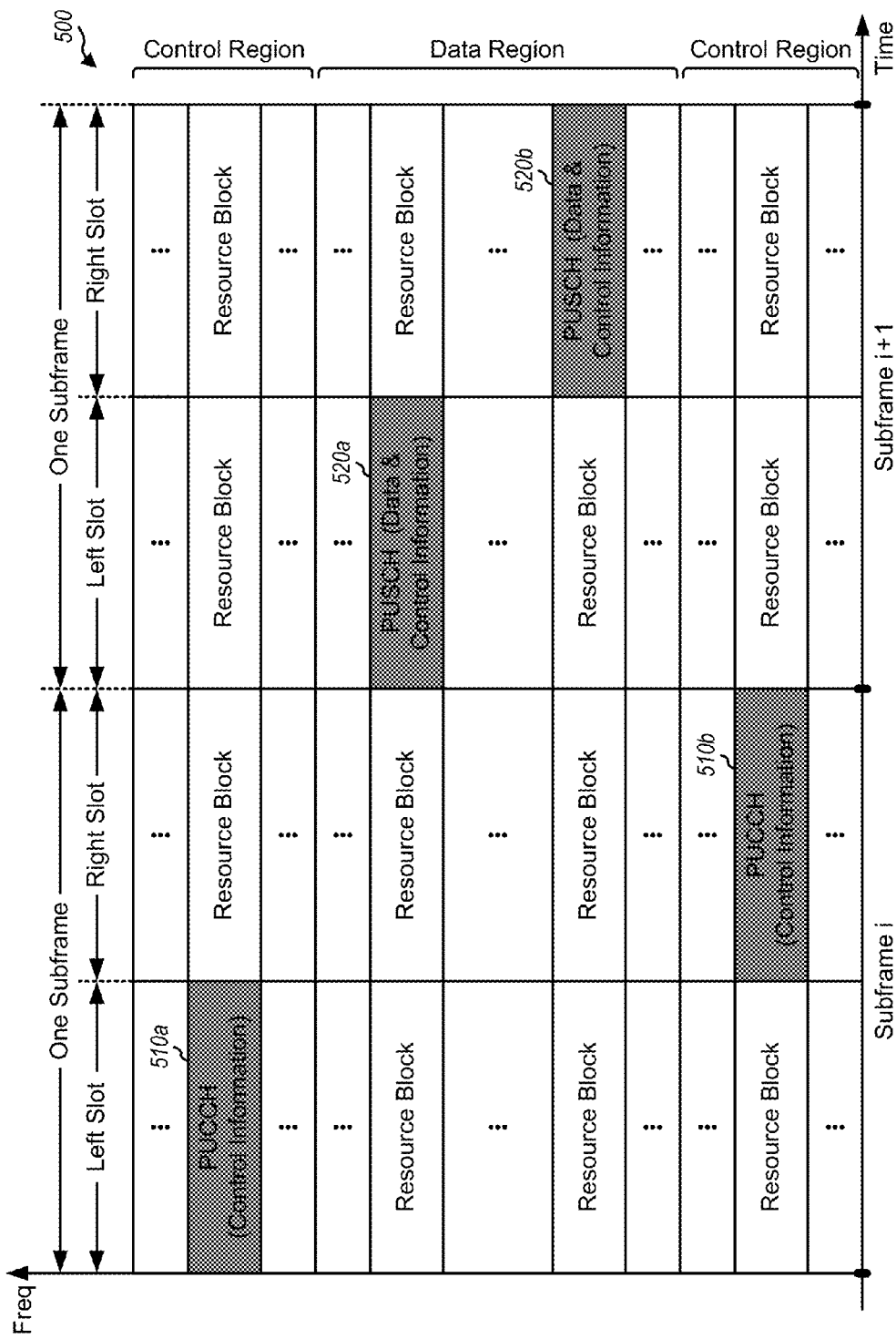
FIG. 5 illustrates exemplary subframe formats for uplink in a wireless communication system.

FIG. 5 shows an exemplary format for the uplink in LTE. The available resource blocks for the uplink may be partitioned into a data region and a control region. The control region may be formed at the two edges of the system bandwidth and may have a configurable size. The data region may include all resource blocks not included in the control region. The design in FIG. 5 results in the data region including contiguous subcarriers, which may allow a single UE to be assigned all of the contiguous subcarriers in the data region.

A UE may be assigned resource blocks in the control region to transmit control information to a base station. The UE may also be assigned resource blocks in the data region to transmit traffic data to the base station. The UE may transmit control information on PUCCH using the assigned resource blocks 510a and 510b in the control region. The UE may transmit only traffic data or both traffic data and control information on PUSCH using the assigned resource blocks 520a and 520b in the data region. An uplink transmission may span both slots of a subframe and may hop across frequency, as shown in FIG. 5.

Figure 6:
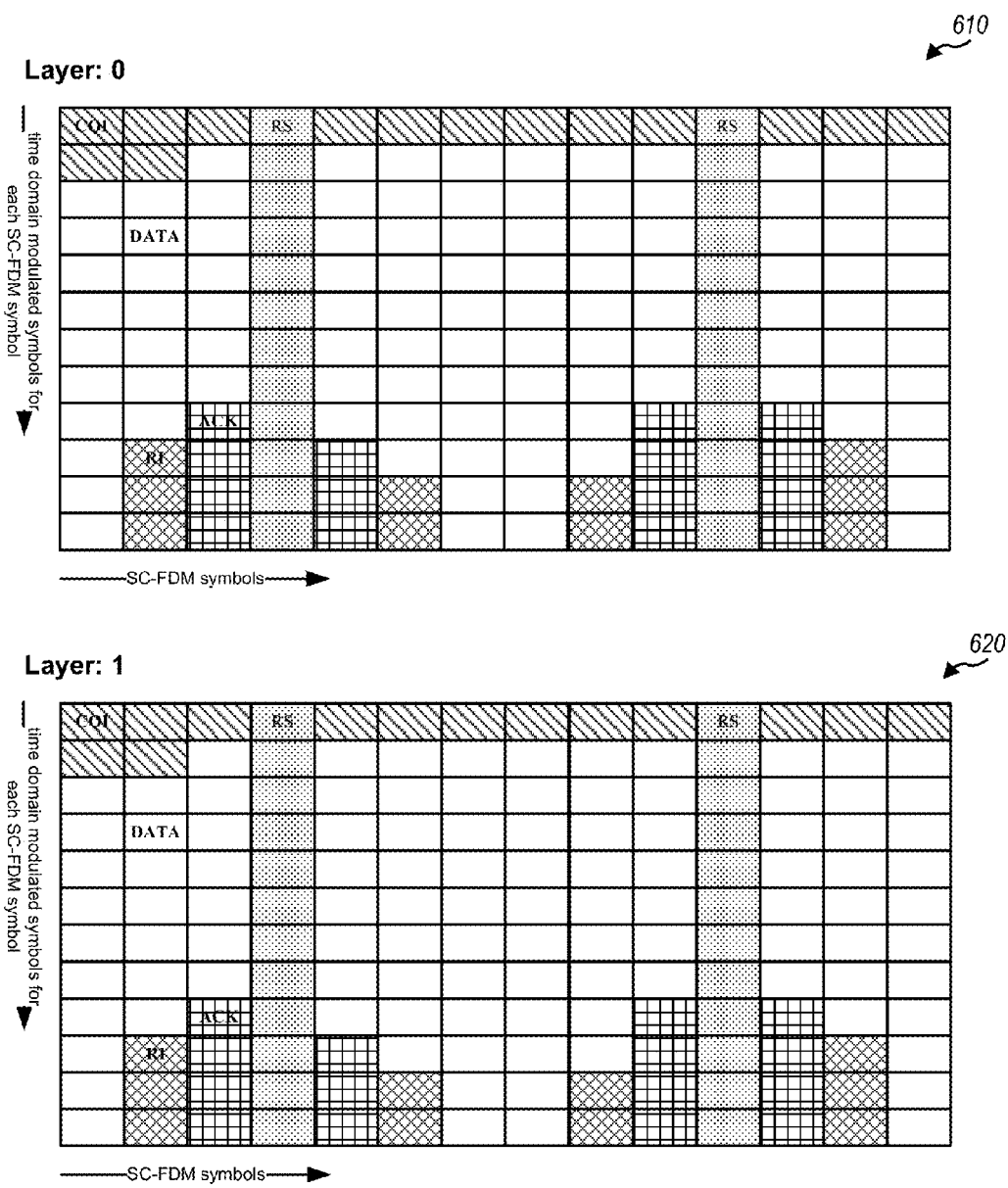
FIG. 6 illustrates exemplary control and data multiplexing across multiple layers in a wireless communication system.

FIG. 6 illustrates exemplary control and data multiplexing across multiple layers in a wireless communication system. FIG. 6 illustrates multiplexing uplink control information (UCI), such as CQI, ACK, or RI, with data mapped onto multiple layers, i.e. layer 0 610 and layer 1 620 for a rank-2 PUSCH transmission. The horizontal axes of the layers 610, 620 may represent the SC-FDM symbols, while the vertical axes of the layers 610, 620 may represent the time domain modulated symbols for each SC-FDM symbol. As illustrated in FIG. 6, the UCI may be mapped to all layers 610, 620 associated with all codewords, and the UCI mapped to each layer may be time-domain aligned in each SC-FDM symbol. Alternatively or in addition, the UCI may be mapped to all layers associated with a subset of all the codewords, where the subset excludes at least one of the codewords. The coded modulation symbols for the UCI may be time-division multiplexed with the data before discrete Fourier transform (DFT) precoding.

In FIG. 6, the UCI information, i.e., the CQI, ACK, and RI symbols, are time domain aligned across each of the layers 610, 620. Accordingly, the UCI may be able to utilize the complete spatial channel. The time-domain alignment across different layers enables close to optimum decoding of the control information with reasonable implementation complexity. Furthermore, the decoding of the UCI does not depend on the decoding of the data, so the decoding latency may be minimized. Thus, when multiplexing UCI with data in PUSCH, the time domain modulation symbols are viewed before DFT precoding from different spatial layers at the same time position as one effective modulation symbol experiencing the complete spatial channel, which offers robustness to UCI.

FIG. 6 further illustrates the reference symbols (RS) in the context of the multiplexed UCI and data. For example, the ACK symbols may be placed adjacent to the RS. As illustrated in FIG. 6, in one example the ACK symbols may not be aligned within each layer; however, since layer 1 mirrors layer 0, the ACK symbols are aligned across the layers 610, 620.

The total number of coded symbols for the UCI within each of the layers may be determined according to the overall spectral efficiency of the MIMO channel. For example, for a rank R SU-MIMO transmission, assuming codeword 0 is scheduled with MCS: $MCS_0$, and codeword 1 is scheduled with modulation coding scheme (MCS): $MCS_1$, then the total number of coded symbols for the UCI: Q' should be determined from the overall spectral efficiency: $f(MCS_0) \cdot R_0 + f(MCS_1) \cdot R_1$, where $R_0$ denotes the number of layers that codeword 0 is mapped to, $R_1$ denotes the number of layers that codeword 1 is mapped to, and function f(•) tells the spectral efficiency of a particular MCS, as $R=R_0+R_1$. The steps of determining the number of coded symbols for the UCI within each of the layers is discussed further in FIGS. 11-13 below.

FIG. 7 is a flow chart representation of a wireless communication methodology 700. At box 702, UCI is determined, such as CQI/PMI, HARQ-ACK, RI, or generally any information related to uplink control. At box 704, a number of symbols for the UCI on each of multiple layers is determined. For example, the number of symbols for the UCI may be based on a spectral resource parameter, such as a spectral efficiency of a MIMO channel between a UE and a base station, and/or an aggregate spectral efficiency over all of the layers, as further discussed in FIGS. 11-13 below. At box 706, the symbols for the UCI are multiplexed with data on each of the layers such that the symbols for the UCI are time aligned across each of the layers. The UCI may be mapped to all of the layers associated with all of the codewords, and the UCI mapped to each layer may be time-domain aligned in each SC-FDM symbol. For example, the symbols for the UCI may be mapped to a same set of at least one symbol location on each of the layers in each symbol period, such as in each SC-FDM/OFDM symbol period. The coded modulation symbols for the UCI may also be time division multiplexed with data before DFT precoding. For example, the symbols for the UCI may be time division multiplexed with modulation symbols for the data on each of the layers, and then DFT may be performed on the multiplexed modulation symbols for the UCI and data for each of the layers in each symbol period, such as in each SC-FDM/OFDM symbol period. At block 708, the multiplexed symbols for the UCI with data on each of the layers may be transmitted on uplink.

FIG. 8 is a block diagram representation of a portion of a wireless communication apparatus 800. The module 802 is provided for UCI, such as CQI/PMI, HARQ-ACK, RI, or generally any information related to uplink control. The module 804 is provided for determining a number of symbols for the UCI on each of multiple spatial layers. For example, the number of the symbols for the UCI may be based on a spectral resource parameter, as discussed in FIGS. 11-13. The module 806 is provided for multiplexing the symbols for the UCI with data on each of the layers such that the symbols for the UCI are time aligned across each of the layers. The module 808 is provided for sending the multiplexed symbols for the UCI with data on the layers on uplink. The communication apparatus 800, the module 802 and the module 804 may further be configured to implement other functions and features discussed herein.

FIG. 9 is a flow chart representation of a wireless communication methodology 900. At box 902, a transmission comprising a number of coded modulation symbols for UCI multiplexed with data is received. For example, the multiplexed UCI with data may be sent on multiple layers on uplink by a UE, such as on all layers associated with all codewords, or on all layers associated with a subset of all the codewords. The coded modulation symbols for the UCI may be time aligned across each of the layers, and the number of the coded modulation symbols on each of the layers may be based on a spectral resource parameter, such as a spectral efficiency of a MIMO channel between the UE and a base station, and/or an aggregate spectral efficiency over all of the layers, as further discussed in FIGS. 11-13 below. At box 904, the received transmission is processed to recover the UCI and data sent by the UE. For example, an inverse discrete Fourier transform (IDFT) may be performed for the received transmission in each symbol period to obtain multiplexed modulation symbols for the UCI and data for each of the layers. The multiplexed modulation symbols may then be time division demultiplexed to obtain modulation symbols for the UCI and modulation symbols for the data for each of the layers.

FIG. 10 is a block diagram representation of a portion of a wireless communication apparatus 1000. The module 1002 is for receiving a transmission comprising a number of coded modulation symbols for UCI multiplexed with data. For example, the multiplexed UCI with data may be sent on multiple spatial layers on uplink by a UE. The coded modulation symbols for the UCI may be time aligned across each of the layers, and the number of the coded modulation symbols on each of the layers may be based on a spectral resource parameter. The module 1004 is for processing the received transmission to recover the UCI and data sent by the UE.

Figure 11:
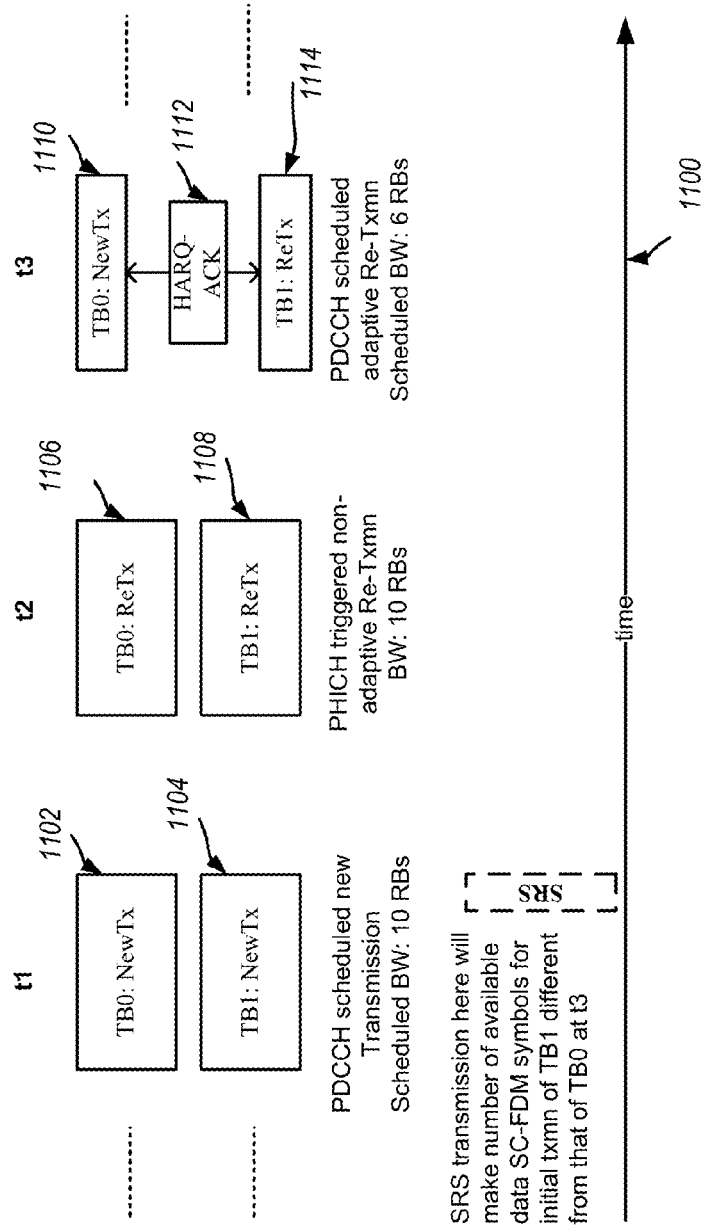
FIG. 11 is a block diagram representation of an exemplary transmission timeline in a wireless communication system.

FIG. 11 is a block diagram representation of an exemplary timeline of transmissions on a horizontal axis 1100, representing linearly increasing time. As previously discussed, the number of coded modulation symbols for UCI on each of the layers may be determined based on one or more spectral efficiency parameters. For example, the number of UCI symbols on each CW and each layer for HARQ-ACK/RI, in the case of a single beta value, may be determined as follows:

$$Q' = \min\left\{ \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH} \right\} \quad \text{Eq (1)}$$

Table 1 lists the various parameters used in Eq (1).

TABLE 1

| Notation | Meaning |
| --- | --- |
| Q' | number of coded modulation symbols |
| O | number of HARQ-ACK or RI bits |
| $H_{sc}^{PUSCH\text{-}initial}$ | initially scheduled bandwidth for the same TB, expressed as number of subcarriers |
| $M_{sc}^{PUSCH}$ | scheduled bandwidth for the current PUSCH in the unit of subcarrier |
| $C^{(x)}$ | number of code blocks for the TB-x |
| $K_r^{(x)}$ | number of information bits for code block number r in TB-x |
| $\beta_{offset}^{PUSCH}$ | offsets configured by higher layers |
| $N_{symb}^{PUSCH\text{-}initial}$ | number of single carrier frequency domain multiplexed (SC-FDM) symbols in the subframe for initial PUSCH transmission |
| $N_{symb}^{PUSCH}$ | number of SC-FDM symbols in the current PUSCH transmission subframe |

In Eq (1), the initial PUSCH transmission parameters may be used as the initial transmission spectral efficiency targets a fixed block error rate (BLER), which may result in achieving a well controlled BLER for the UCI information after taking into account the offset $\beta_{offset}^{PUSCH}$.

However, the accuracy of the computation of the number coded modulation symbols Q' may be improved in certain scenarios. For example, when a UL grant from the eNodeB 110 schedules new transmissions of two transport blocks simultaneously, the formula for computing the number of UCI symbols on each CW and each layer for HARQ-ACK or RI shown in Eq (1) works accurately because the two TBs have the same transmission bandwidth in their corresponding initial grants. However, as further explained below, it is possible that one UL grant could schedule two TBs whose initial grants are not synchronous, in which case the computation of Q' may be improved.

For example, at time t1, transmissions 1102, 1104 may be scheduled for transport blocks TB0 and TB1 using the PDCCH. Without loss of generality, it is assumed that the transmissions at time t1 take 10 resource blocks (RBs). In certain scenarios, at time t2, the transmissions may be repeated (blocks 1106, 1108) due to changes in the channel. For example, PHICH may trigger a non-adaptive retransmission for both TB0 and TB1. For example, the transmissions 1106, 1108 will also have 10 RBs as their initial bandwidth. However, the initial transmission bandwidth is different for the two scheduled TBs 1110 and 1114 (e.g., 6 RBs for TB1 while still 10 RBs for TB2), when HARQ-ACK is to be multiplexed with PUSCH at time t3.

Alternatively, the bandwidth calculation of TB0 and TB1 at time t3 may differ if a sounding reference signal (SRS) is transmitted at time t1, then the number of available data SC-FDM symbols for the initial transmission of the two TBs turns out to be different at time t3 (because a symbol is used for the SRS at time t1). Therefore, the $N_{symb}^{PUSCH\text{-}initial(x)}$ variable in the enumerator of Eq (1) may be different for an initial transmission and a retransmission of a transport block.

Thus, when the initial uplink (UL) grants for the two TBs are not scheduled at the same time, guidance on how to choose the parameters $M_{sc}^{PUSCH\text{-}initial}$ and $N_{symb}^{PUSCH\text{-}initial}$ in eq. (1) may be required.

For example, the following modified formula may supersede eq. (1) for determining the number of UCI symbols on each CW and each layer for HARQ-ACK/RI:

$$Q' = \min\left\{ \left\lceil \frac{(O \cdot \beta_{offset}^{PUSCH})}{\frac{\sum_{r=0}^{C^{(0)}-1} K_r^{(0)}}{M_{sc}^{PUSCH\text{-}initial(0)} \cdot N_{symb}^{PUSCH\text{-}initial(0)}} + \frac{\sum_{r=0}^{C^{(1)}-1} K_r^{(1)}}{M_{sc}^{PUSCH\text{-}initial(1)} \cdot N_{symb}^{PUSCH\text{-}initial(1)}}} \right\rceil, 4 \cdot M_{sc}^{PUSCH} \right\}. \quad \text{Eq (2)}$$

In Eq(2), $M_{sc}^{PUSCH\text{-}initial(x)}$ represents scheduled bandwidth in the initial grant for TBx (x=0, 1) and $N_{symb}^{PUSCH\text{-}initial(x)}$ represents a number of SC-FDMA symbols per subframe for initial PUSCH transmission for TBx.

As may be appreciated, the denominator in Eq (2) attempts to compute the aggregate spectral efficiency over all spatial layers from the individual initial grant separately for each of the scheduled TBs.

It may be appreciated that Eq (2) falls back to Eq (1) when the two TBs were scheduled for their initial transmission simultaneously.

It may be further appreciated that Eq (2) can be equivalently rewritten as:

$$Q' = \max[\min(Q'_{temp}, 4 \cdot M_{sc}^{PUSCH}), Q'_{min}] \text{ with} \quad \text{Eq (3)}$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil.$$

During operation, UEs 120 may occasionally miss receiving and using UL grants. The eNB 110 therefore may have to take into account multiple possible reasons for retransmission, including a grant miss by the UE 120, when estimating the numbed of coded modulation symbols for the transmission of HARQ-ACK or RI. In order to reduce the amount of hypotheses to be tested at eNB 110 when taking into account the various possible scenarios for retransmission to the UE 120, the following reduced computational complexity approaches may be taken:

TABLE 2

Approaches for Complexity Reduction

| Approach Index | Details |
|---|---|
| | $Q' = \min\left\{ \left\lceil \dfrac{O \cdot \beta_{offset}^{PUSCH}}{A_0 \cdot \sum_{r=0}^{C^{(0)}-1} K_r^{(0)} + A_1 \cdot \sum_{r=0}^{C^{(1)}-1} K_r^{(1)}} \right\rceil, 4 \cdot M_{sc}^{PUSCH} \right\}$ |
| 1 | set $A_1 = A_0$, i.e. use initial grant for TB0 to obtain: $M_{sc}^{PUSCH-initial}$ and $N_{symb}^{PUSCH-initial}$ in eq. (1) |
| 2 | set $A_0, A_1 = \min\{A_0, A_1\}$, underestimate the aggregate spectral efficiency over all layers sometimes → more reliable control |
| 3 | set $A_0, A_1 = \max\{A_0, A_1\}$, overestimate the aggregate spectral efficiency over all layers sometimes → less reliable control with the same beta offset value |

Note:

$A_0 := \dfrac{1}{M_{sc}^{PUSCH-initial(0)} \cdot N_{symb}^{PUSCH-initial(0)}}$, $A_1 := \dfrac{1}{M_{sc}^{PUSCH-initial(1)} \cdot N_{symb}^{PUSCH-initial(1)}}$ represents a first and a second spectral resource parameters that are calculated based on the initially scheduled transmissions of TB0 and TB1.

Furthermore, the number of coded modulation symbols for the CQI on each layer may be determined by:

$$Q'_{CQI} = \min\left\{ \left\lceil \dfrac{(O_{CQI} + L) \cdot M_{sc}^{PUSCH-initial} \cdot N_{symb}^{PUSCH-initial} \cdot \beta_{Offset}^{CQI}}{\sum_{r=0}^{C^{(0)}-1} K_r^{(0)} + \sum_{r=0}^{C^{(1)}-1} K_r^{(1)}} \right\rceil, \right.$$

$$\left. M_{sc}^{PUSCH} \cdot M_{symb}^{PUSCH} - Q'_{RI} \right\}.$$

The CQI information may be multiplexed on fewer than all TBs used for data transmission. For example, the CQI can be multiplexed on all layers of one of the TBs used for data transmission. However, even in this case the system can ensure that the UCI symbols are time-aligned across all layers onto which UCI symbols are mapped.

FIG. 12 is a flow chart 1200 of a process of wireless communication. At box 1202, a first spectral resource parameter is computed based on an initially scheduled spectral allocation for a first transport block. At box 1204, a second spectral resource parameter is computed based on an initially scheduled spectral allocation for a second transport block. At box 1206, a number of symbols, such as coded modulation symbols, for UCI on each of the layers is determined using the first and the second spectral resource parameters, such as through the use of Eq (2) as discussed above. The determined number of coded modulation symbols may be mapped to each of the layers. For example, if at operation 1206, the number of coded modulation symbols is determined to be x, then x coded modulation symbols may be mapped to each of the layers.

FIG. 13 is a block diagram representation of a wireless communication apparatus comprising a module 1302 for computing a first spectral resource parameter based on an initially scheduled spectral allocation for a first transport block, a module 1304 for computing a second spectral resource parameter based on an initially scheduled spectral allocation for a second transport block and a module 1306 for determining a number symbols, such as coded modulation symbols, for UCI on each of multiple layers using the first and the second spectral resource parameters, such as through the use of Eq (2) as discussed above. The number of coded modulation symbols may be mapped to each of the layers. For example, if module 1306 determines that there should be x coded modulation symbols for UCI, then x coded modulation symbols for UCI may be mapped to each of the layers.

Figure 14:
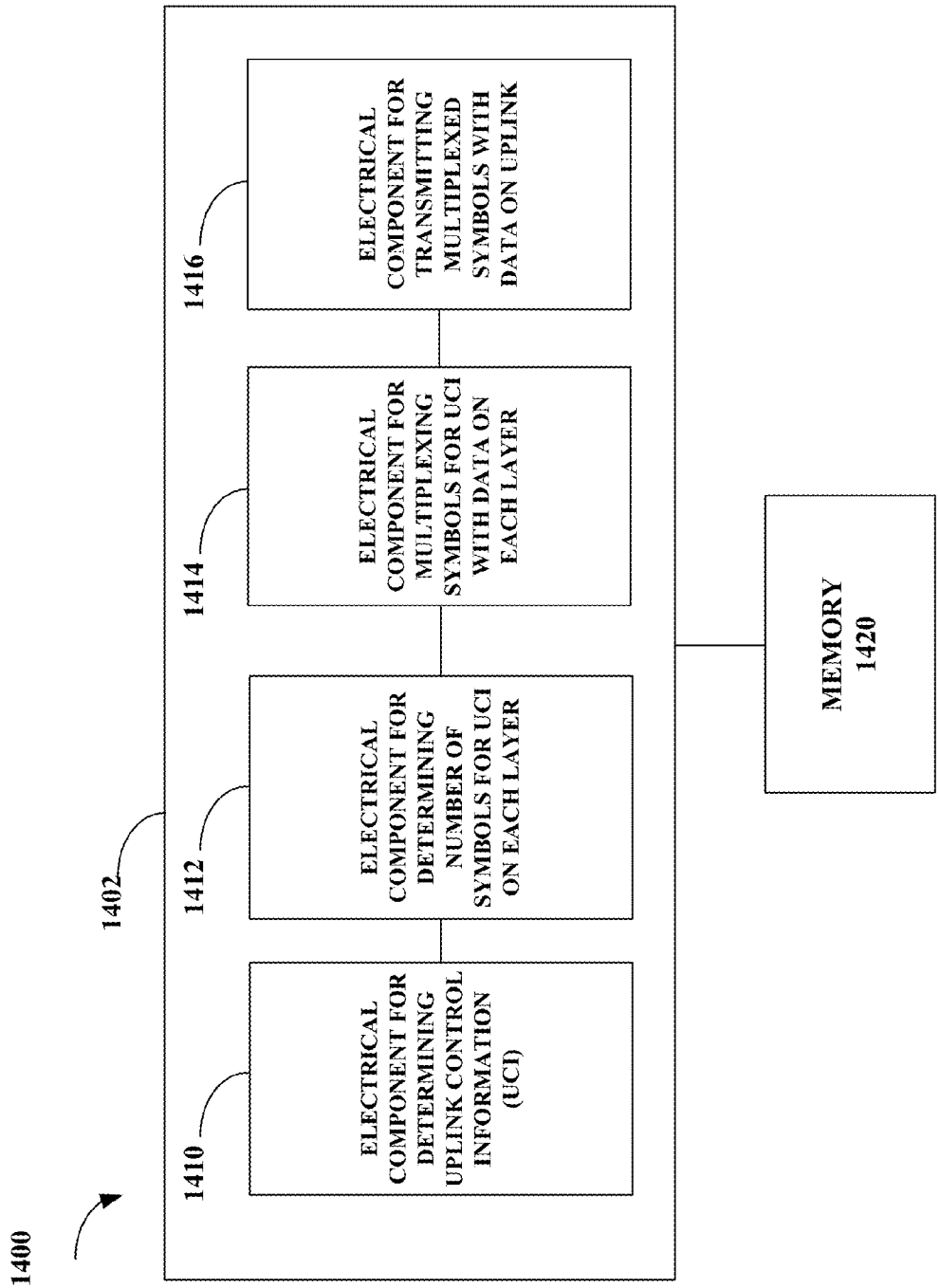
FIG. 14 is an illustration of an exemplary coupling of electrical components that facilitates multiplexing control and data across multiple layers according to an embodiment.

Referring next to FIG. 14, illustrated is a system 1400 that facilitates multiplexing control and data across multiple layers according to an embodiment. System 1400 includes functional blocks that can represent functions implemented by a processor, software, or combination thereof (e.g., firmware), wherein system 1400 includes a logical grouping 1402 of electrical components that can act in conjunction. As illustrated, logical grouping 1402 can include an electrical component for determining UCI 1410, as well as an electrical component for determining a number of symbols for the UCI on each of multiple layers. For example, the number of symbols for the UCI may be based on a spectral resource parameter. Logical grouping 1402 can also include an electrical component for multiplexing symbols for the UCI with data on each layer such that the symbols for the UCI are time aligned across each of the layers. Further, logical grouping 1402 can include an electrical component for transmitting the multiplexed symbols for the UCI with the data on the layers on uplink. Additionally, system 1400 can include a memory 1420 that retains instructions for executing functions associated with electrical components 1410, 1412, 1414, and 1416, wherein any of electrical components 1410, 1412, 1414, and 1416 can exist either within or outside memory 1420.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein (e.g., identifiers, assigners, transmitters and allocators), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communication, comprising:
   determining uplink control information (UCI);
   determining a number of symbols for the UCI on each of a plurality of layers based on a spectral resource parameters computed for a plurality of transport blocks;
   multiplexing symbols for the UCI with data on each of the plurality of layers such that the symbols for the UCI are time aligned across each of the plurality of layers; and
   sending the multiplexed symbols for the UCI with the data on the plurality of layers on uplink,
   wherein the determining the number of symbols for the UCI on each of the plurality of layers based on the spectral resource parameters includes determining the number of symbols for the UCI on each of the plurality of layers based on:

$$Q' = \max[\min(Q'_{temp}, 4 \cdot M_{sc}^{PUSCH}), Q'_{min}]$$

$$Q'_{temp} = \left[ \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right]$$

wherein Q' represents the number of symbols for UCI on each of the plurality of layers, Q'$_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

2. The method of claim 1, wherein the multiplexing the symbols for the UCI with data on each of the plurality of layers includes:
   time division multiplexing the symbols for the UCI with modulation symbols for the data on each of the plurality of layers, and
   performing discrete Fourier transform (DFT) on the multiplexed modulation symbols for the UCI and data for each of the plurality of layers in each symbol period.

3. The method of claim 2, wherein each symbol period includes a single-carrier frequency division multiplexing (SC-FDM)/orthogonal frequency division multiplexing (OFDM) symbol period.

4. The method of claim 1, wherein the multiplexing the symbols for the UCI with data on each of the plurality of layers includes mapping the symbols for the UCI to a same set of at least one symbol location on each of the plurality of layers in each symbol period.

5. The method of claim 1, wherein the spectral resource parameters include a spectral efficiency of a multiple-input multiple-output (MIMO) channel between a user equipment (UE) and a base station.

6. The method of claim 1, wherein the spectral resource parameters include an aggregate spectral efficiency over all of the plurality of layers.

7. The method of claim 1, wherein the determining the number of symbols for the UCI on each of the plurality of layers based on the spectral resource parameters includes:
   computing a first spectral resource parameter based on an initially scheduled spectral allocation for a first transport block in the plurality of transport blocks;
   computing a second spectral resource parameter based on an initially scheduled spectral allocation for a second transport block in the plurality of transport blocks; and
   determining the number symbols for the UCI on each of the plurality of layers using the first and the second spectral resource parameters.

8. The method of claim 7, wherein the symbols for the UCI include coded modulation symbols.

9. The method of claim 1, wherein the UCI includes one of a channel quality indicator (CQI), an acknowledgement (ACK), a rank indicator (RI) and a combination thereof.

10. The method of claim 1, wherein the plurality of layers include all layers associated with all codewords.

11. The method of claim 1, wherein the plurality of layers includes all layers associated with a subset of all codewords, wherein the subset of all codewords excludes at least one of the codewords.

12. An apparatus for wireless communication, comprising:
   means for determining uplink control information (UCI);
   means for determining a number of symbols for the UCI on each of a plurality of layers based on spectral resource parameters computed for a plurality of transport blocks;
   means for multiplexing symbols for the UCI with data on each of the plurality of layers such that the symbols for the UCI are time aligned across each of the plurality of layers; and
   means for sending the multiplexed symbols for the UCI with the data on the plurality of layers on uplink,
   wherein the means for determining the number of symbols for the UCI on each of the plurality of layers based on the spectral resource parameters includes means for determining the number of symbols for the UCI on each of the plurality of layers based on:

$$Q' = \max[\min(Q'_{temp}, 4 \cdot M_{sc}^{PUSCH}), Q'_{min}]$$

$$Q'_{temp} = \left\lceil \frac{\left(O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}\right)}{\left(\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}\right)} \right\rceil$$

wherein Q' represents the number of symbols for UCI on each of the plurality of layers, $Q'_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

13. The apparatus of claim 12, wherein the means for multiplexing the symbols for the UCI with data on each of the plurality of layers includes:
   means for time division multiplexing the symbols for the UCI with modulation symbols for the data on each of the plurality of layers, and
   means for performing discrete Fourier transform (DFT) on the multiplexed modulation symbols for the UCI and data for each of the plurality of layers in each symbol period.

14. The apparatus of claim 13, wherein each symbol period includes a single-carrier frequency division multiplexing (SC-FDM)/orthogonal frequency division multiplexing (OFDM) symbol period.

15. The apparatus of claim 12, wherein the means for multiplexing the symbols for the UCI with data on each of the plurality of layers includes means for mapping the symbols for the UCI to a same set of at least one symbol location on each of the plurality of layers in each symbol period.

16. The apparatus of claim 12, wherein the spectral resource parameters include a spectral efficiency of a multiple-input multiple-output (MIMO) channel between a user equipment (UE) and a base station.

17. The apparatus of claim 12, wherein the spectral resource parameters include an aggregate spectral efficiency over all of the plurality of layers.

18. The apparatus of claim 12, wherein the means for determining the number of symbols for the UCI on each of the plurality of layers based on the spectral resource parameters includes:
   means for computing a first spectral resource parameter based on an initially scheduled spectral allocation for a first transport block in the plurality of transport blocks;
   means for computing a second spectral resource parameter based on an initially scheduled spectral allocation for a second transport block in the plurality of transport blocks; and
   means for determining the number symbols for the UCI on each of the plurality of layers using the first and the second spectral resource parameters.

19. The apparatus of claim 18, wherein the symbols for the UCI include coded modulation symbols.

20. The apparatus of claim 12, wherein the UCI includes one of a channel quality indicator (CQI), an acknowledgement (ACK), a rank indicator (RI) and a combination thereof.

21. The apparatus of claim 12, wherein the plurality of layers includes all layers associated with all codewords.

22. The apparatus of claim 12, wherein the plurality of layers includes all layers associated with a subset of all codewords, wherein the subset of all codewords excludes at least one of the codewords.

23. An apparatus for wireless communication, comprising:
   at least one processor configured to:
      determine uplink control information (UCI);
      determine a number of symbols for the UCI on each of a plurality of layers based on spectral resource parameters computed for a plurality of transport blocks;
      multiplex symbols for the UCI with data on each of the plurality of layers such that the symbols for the UCI are time aligned across each of the plurality of layers; and
      send the multiplexed symbols for the UCI with the data on the plurality of layers on uplink; and
   a memory coupled to the at least one processor, wherein the at least one processor is further configured to determine the number of symbols for the UCI on each of the plurality of layers based on:

$$Q' = \max[\min(Q'_{temp}, 4 \cdot M_{sc}^{PUSCH}), Q'_{min}]$$

$$Q'_{temp} = \left\lceil \frac{\left(O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}\right)}{\left(\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}\right)} \right\rceil$$

wherein Q' represents the number of symbols for UCI on each of the plurality of layers, $Q'_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

24. The apparatus of claim 23, wherein the spectral resource parameters include a spectral efficiency of a multiple-input multiple-output (MIMO) channel between a user equipment (UE) and a base station.

25. The apparatus of claim 23, wherein the spectral resource parameters include an aggregate spectral efficiency over all of the plurality of layers.

26. The apparatus of claim 23, wherein the at least one processor is further configured to compute a first spectral resource parameter based on an initially scheduled spectral allocation for a first transport block in the plurality of transport blocks, compute a second spectral resource parameter based on an initially scheduled spectral allocation for a second transport block in the plurality of transport blocks, and determine the number symbols for the UCI on each of the plurality of layers using the first and the second spectral resource parameters.

27. The apparatus of claim 26, wherein the symbols for the UCI include coded modulation symbols.

28. The apparatus of claim 23, wherein the UCI includes one of a channel quality indicator (CQI), an acknowledgement (ACK), a rank indicator (RI) and a combination thereof.

29. A computer program product comprising a non-transitory computer-readable storage medium, the computer-readable storage medium comprising:
 instructions for causing at least one computer to determine uplink control information (UCI);
 instructions for causing the at least one computer to determine a number of symbols for the UCI on each of a plurality of layers based on spectral resource parameters computed for a plurality of transport blocks;
 instructions for causing the at least one computer to multiplex symbols for the UCI with data on each of the plurality of layers such that the symbols for the UCI are time aligned across each of the plurality of layers; and
 instructions for causing the at least one computer to send the multiplexed symbols for the UCI with the data on the plurality of layers on uplink,
 wherein the instructions for causing the at least one computer to determine the number of symbols for the UCI on each of the plurality of layers based on the spectral resource parameters includes instructions for causing the at least one computer to determine the number of symbols for the UCI on each of the plurality of layers based on:

$$Q' = \max[\min(Q'_{temp}, 4 \cdot M_{sc}^{PUSCH}), Q'_{min}]$$

$$Q'_{temp} = \left\lceil \frac{\left(O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}\right)}{\left(\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}\right)} \right\rceil$$

wherein Q' represents the number of symbols for UCI on each of the plurality of layers, $Q'_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

30. The computer program product of claim 29, wherein the instructions for causing the at least one computer to determine the number of symbols for the UCI on each of the plurality of layers based on the spectral resource parameters includes:
 instructions for causing the at least one computer to compute a first spectral resource parameter based on an initially scheduled spectral allocation for a first transport block in the plurality of transport blocks;
 instructions for causing the at least one computer to compute a second spectral resource parameter based on an initially scheduled spectral allocation for a second transport block in the plurality of transport blocks; and
 instructions for causing the at least one computer to determine the number symbols for the UCI on each of the plurality of layers using the first and the second spectral resource parameters.

31. The computer program product of claim 30, wherein the symbols for the UCI include coded modulation symbols.

32. The computer program product of claim 29, wherein the UCI includes one of a channel quality indicator (CQI), an acknowledgement (ACK), a rank indicator (RI) and a combination thereof.

33. A method for wireless communication, comprising:
receiving a transmission including a number of coded modulation symbols for uplink control information (UCI) multiplexed with data and sent on a plurality of layers on uplink by a user equipment (UE), such that the coded modulation symbols for the UCI are time aligned across each of the plurality of layers, and the number of the coded modulation symbols on each of the plurality of layers is based on spectral resource parameters computed for a plurality of transport blocks; and
processing the received transmission to recover the UCI and data sent by the UE,
wherein the number of symbols for the UCI on each of the plurality of layers based on spectral resource parameters is based on:

$$Q' = \max[\min(Q'_{temp}, 4 \cdot M_{sc}^{PUSCH}), Q'_{min}]$$

$$Q'_{temp} = \left\lceil \frac{\left(O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}\right)}{\left(\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}\right)} \right\rceil$$

wherein Q' represents the number of symbols for UCI on each of the plurality of layers, $Q'_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

34. The method of claim 33, wherein the processing the received transmission includes:
performing inverse discrete Fourier transform (IDFT) for the received transmission in each symbol period to obtain multiplexed modulation symbols for the UCI and data for each of the plurality of layers, and
time division demultiplexing the multiplexed modulation symbols to obtain modulation symbols for the UCI and modulation symbols for the data for each of the plurality of layers.

35. The method of claim 33, wherein the spectral resource parameters include a spectral efficiency of a multiple-input multiple-output (MIMO) channel between a user equipment (UE) and a base station.

36. The method of claim 33, wherein the spectral resource parameters include an aggregate spectral efficiency over all of the plurality of layers.

37. The method of claim 33, wherein the UCI includes one of a channel quality indicator (CQI), an acknowledgement (ACK), a rank indicator (RI) and a combination thereof.

38. The method of claim 33, wherein the plurality of layers includes all layers associated with all codewords.

39. The method of claim 33, wherein the plurality of layers includes all layers associated with a subset of all codewords, wherein the subset of all codewords excludes at least one of the codewords.

40. An apparatus for wireless communication, comprising:
means for receiving a transmission including a number of coded modulation symbols for uplink control information (UCI) multiplexed with data and sent on a plurality of layers on uplink by a user equipment (UE), wherein the coded modulation symbols for the UCI are time aligned across each of the plurality of layers, and the number of the coded modulation symbols on each of the plurality of layers is based on spectral resource parameters computed for a plurality of transport blocks; and
means for processing the received transmission to recover the UCI and data sent by the UE,
wherein the number of symbols for the UCI on each of the plurality of layers based on the spectral resource parameters is based on:

$$Q' = \max[\min(Q'_{temp}, 4 \cdot M_{sc}^{PUSCH}), Q'_{min}]$$

$$Q'_{temp} = \left\lceil \frac{\left(O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}\right)}{\left(\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}\right)} \right\rceil$$

wherein Q' represents the number of symbols for UCI on each of the plurality of layers, $Q'_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

41. The apparatus of claim 40, wherein the means for processing the received transmission includes:
means for performing inverse discrete Fourier transform (IDFT) for the received transmission in each symbol period to obtain multiplexed modulation symbols for the UCI and data for each of the plurality of layers, and
means for time division demultiplexing the multiplexed modulation symbols to obtain modulation symbols for the UCI and modulation symbols for the data for each of the plurality of layers.

42. The apparatus of claim 40, wherein the spectral resource parameters include a spectral efficiency of a multiple-input multiple-output (MIMO) channel between the user equipment (UE) and a base station.

43. The apparatus of claim 40, wherein the spectral resource parameters include an aggregate spectral efficiency over all of the plurality of layers.

44. The apparatus of claim 40, wherein the UCI includes one of a channel quality indicator (CQI), an acknowledgement (ACK), a rank indicator (RI) and a combination thereof.

45. The apparatus of claim 40, wherein the plurality of layers includes all layers associated with all codewords.

46. The apparatus of claim 40, wherein the plurality of layers includes all layers associated with a subset of all codewords, wherein the subset of all codewords excludes at least one of the codewords.

47. An apparatus for wireless communication, comprising:
at least one processor configured to:
receive a transmission including a number of coded modulation symbols for uplink control information (UCI) multiplexed with data and sent on a plurality of layers on uplink by a user equipment (UE), wherein the coded modulation symbols for the UCI are time aligned across each of the plurality of layers, and the number of the coded modulation symbols on each of the plurality of layers is based on spectral resource parameters computed for a plurality of transport blocks; and
process the received transmission to recover the UCI and data sent by the UE; and a memory coupled to the at least one processor,
wherein the number of symbols for the UCI on each of the plurality of layers based on the spectral resource parameters is based on:

$$Q' = \max[\min(Q'_{temp}, 4 \cdot M_{sc}^{PUSCH}), Q'_{min}]$$

$$Q'_{temp} = \left\lceil \frac{\left(O \cdot M_{sc}^{PUSCH-initial(1)} \cdot N_{symb}^{PUSCH-initial(1)} \cdot \right.}{\left. M_{sc}^{PUSCH-initial(2)} \cdot N_{symb}^{PUSCH-initial(2)} \cdot \beta_{offset}^{PUSCH}\right)}{\left(\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}\right)} \right\rceil$$

wherein Q' represents the number of symbols for UCI on each of the plurality of layers, $Q'_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

48. The apparatus of claim 47, wherein the spectral resource parameters include a spectral efficiency of a multiple-input multiple-output (MIMO) channel between the user equipment (UE) and a base station.

49. The apparatus of claim 47, wherein the UCI includes one of a channel quality indicator (CQI), an acknowledgement (ACK), a rank indicator (RI) and a combination thereof.

50. A computer program product comprising a non-transitory computer-readable storage medium, the computer-readable storage medium comprising:
instructions for causing at least one computer to receive a transmission including a number of coded modulation symbols for uplink control information (UCI) multiplexed with data and sent on a plurality of layers on uplink by a user equipment (UE), wherein the coded modulation symbols for the UCI are time aligned across each of the plurality of layers, and the number of the coded modulation symbols on each of the plurality of layers is based on spectral resource parameters computed for a plurality of transport blocks; and
instructions for causing the at least one computer to process the received transmission to recover the UCI and data sent by the UE,
wherein the number of symbols for the UCI on each of the plurality of layers based on the spectral resource parameters is based on:

$$Q' = \max[\min(Q'_{temp}, 4 \cdot M_{sc}^{PUSCH}), Q'_{min}]$$

$$Q'_{temp} = \left\lceil \frac{\left(O \cdot M_{sc}^{PUSCH-initial(1)} \cdot N_{symb}^{PUSCH-initial(1)} \cdot \right.}{\left. M_{sc}^{PUSCH-initial(2)} \cdot N_{symb}^{PUSCH-initial(2)} \cdot \beta_{offset}^{PUSCH}\right)}{\left(\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}\right)} \right\rceil$$

wherein Q' represents the number of symbols for UCI on each of the plurality of layers, $Q'_{min}$ represents a minimum number of symbols for UCI on each of the plurality of layers, O represents a number of Hybrid Automatic Repeat-Request (HARQ) data acknowledgement (ACK) bits or a number of rank indicator (RI) bits, $\beta_{offset}^{PUSCH}$ represents an offset configured by a higher layer, $C^{(x)}$ represents a number of code blocks for transport block (TB) x, $K_r^{(x)}$ represents a number of bits for code block r in the transport block (TB) x, $M_{sc}^{PUSCH-initial}$ represents an initially scheduled bandwidth for a transport block, expressed as a number of subcarriers, $M_{sc}^{PUSCH}$ represents a scheduled bandwidth for the current physical uplink shared channel (PUSCH) in a unit of subcarrier and $N_{symb}^{PUSCH-initial}$ represents a number of single-carrier frequency division multiplexing (SC-FDM) symbols in a subframe for an initial PUSCH transmission.

51. The computer program product of claim 50, wherein the spectral resource parameters include an aggregate spectral efficiency over all of the plurality of layers.

52. The computer program product of claim 50, wherein the UCI includes one of a channel quality indicator (CQI), an acknowledgement (ACK), a rank indicator (RI) and a combination thereof.

* * * * *